(12) United States Patent
Matsubara et al.

(10) Patent No.: US 6,313,593 B1
(45) Date of Patent: Nov. 6, 2001

(54) MOTOR CONTROLLER

(75) Inventors: Shunsuke Matsubara; Naoyuki Suzuki; Akira Hirai, all of Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/614,174

(22) Filed: Jul. 11, 2000

(30) Foreign Application Priority Data

Jul. 12, 1999 (JP) .................................................. 11-197174

(51) Int. Cl.[7] .................................................... H02K 17/32
(52) U.S. Cl. .......................... 318/434; 318/798; 318/801; 318/806; 318/800; 318/812; 318/807
(58) Field of Search .................................. 310/798, 801, 310/806, 811, 800, 805, 812, 807, 434

(56) References Cited

U.S. PATENT DOCUMENTS

| | | | |
|---|---|---|---|
| 5,504,517 | * | 4/1996 | Takashi et al. ........................ 347/246 |
| 5,569,995 | * | 10/1996 | Kusaka et al. ........................ 318/717 |
| 5,917,319 | * | 6/1999 | Frank et al. ........................ 324/158.1 |

FOREIGN PATENT DOCUMENTS

| | | | |
|---|---|---|---|
| 63-085404 | 5/1988 | (JP) | ................. G01D/3/02 |
| 2-53291 | 2/1990 | (JP) | ................. H02P/5/17 |
| 2-280700 | 11/1990 | (JP) | ................. H02P/9/30 |
| 3-124290 | 5/1991 | (JP) | . |
| 6-121442 | 4/1994 | (JP) | ................. H02H/3/02 |
| 7-16549 | 7/1995 | (JP) | ................. H02H/7/085 |
| 7-327382 | 12/1995 | (JP) | ................. H02P/5/41 |
| 10-221382 | 8/1998 | (JP) | ................. G01R/19/00 |

* cited by examiner

Primary Examiner—Karen Masih
(74) Attorney, Agent, or Firm—Staas & Halsey, LLP

(57) ABSTRACT

Provided to the motor controller is means which can alter a conversion ratio with which a current value detected by a current detector is converted into a unit (such as voltage) easily usable in motor current control. According to the maximum current value of the motor and the demagnetization limit current of the motor, an optimum conversion ratio is selected and switched over. By making it possible to select and preset a conversion ratio, a plurality of motors can be controlled by one motor controller. Therefore, restrictions imposed on the combination of the motor controller and the motor are lightened.

8 Claims, 4 Drawing Sheets

MOTOR CONTROLLER

BACKGROUND OF THE INVENTION

1. Field of the Invention

The present invention relates to a motor controller, and in particular to a motor controller which is used as a drive source of various machines such as machine tools, industrial equipments, and robots, and in which feedback control of a drive current for driving a motor is conducted.

2. Description of the Prior Art

In a motor controller which detects a current flowing through a motor and which utilizes the detected current for current control of the motor, the detected motor current is converted into a unit which can be readily utilized for control, such as voltage, with a certain conversion ratio, and then utilized. Furthermore, in the motor controller, there is provided a function of detecting an overcurrent and interrupting the motor current, in order to protect a permanent magnet motor from destruction caused by demagnetization in the case where the control is disabled or in the case where switching power elements are subjected to short mode destruction.

FIG. 2 is a block diagram of a principal part of a motor controller for effecting feedback control of this motor current. Reference numeral 10 denotes an inverter circuit for generating AC power of an arbitrary frequency from a DC power source E. In this inverse circuit 10, diodes D1 to D6 are connected parallel to switching elements T1 to T6 formed of power elements such as IGBTs, in the reverse direction, respectively, forming 6 sets of parallel circuit. Further, these 6 sets of parallel circuits (T1-D1; T2-D2; . . . T6-D6) are arranged 3 sets of series connections each composed of two parallel circuits. And these 3 sets of series connections are connected in parallel to the DC power source. Moreover, a connection point between 2 sets of parallel circuits which constitute a set of series connection is connected to one of U, V and W phases of a motor.

A current flowing through each phase winding is detected by a current detector 20, and converted to a unit which is easy to be used for control of voltage or the like. This converted voltage is fed back to current control means 40. On the basis of a current command and the detected current value thus fed back, the current control means 40 effects current feedback control, and outputs a PWM generation signal to PWM signal generation means 60. On the basis of the PWM generation signal, the PWM signal generation means generates a PWM signal which turns on/off the switching elements T1 to T6 of the inverter circuit 10.

Furthermore, an overcurrent detection circuit 50 is provided to the motor controller. If a signal obtained by converting a current detected by the current detection means 20 to a voltage exceeds a preset level, then the overcurrent detection circuit 50 outputs a signal to the PWM signal generation circuit 60 and thereby inhibits a PWM signal output from the PWM signal generation circuit 60.

As described above, the current detection means 20 converts the detected current value to an easily usable voltage and outputs the voltage. The conversion ratio between the current and voltage in the current detection means is fixed in the prior art. On the other hand, it is desirable that the signal converted from current into voltage has a dynamic range wide as far as possible in order to stabilize the motor control.

For example, in a motor which is at least 50 A in motor demagnetization limit current, the current detection means 20 in the controller converts a commanded maximum current 40 A to a voltage 4 V, and an overcurrent protection voltage (i.e., a voltage at which output of the PWM signal is inhibited and the switching elements are turned off) is set to 5 V. In FIG. 2, this example is shown, and a full range for current control is set to 4 V and an overcurrent detection level is set to 5 V.

On the other hand, in a motor which is at least 100 A in motor demagnetization limit current, an commanded maximum current 80 A is converted to a voltage 4 V, and an overcurrent protection voltage is set to 5 V (5 V×80 A/4 V=100 A).

In the prior art motor controller, the conversion ratio to voltage or like in the current detection means is fixed. In addition, the conversion ratio is determined on the basis of conditions of the motor maximum current and the motor demagnetization limit current. Accordingly, there occur restrictions in the combination of the motor controller and the motor.

Especially, in the case of a multi-shaft controller in which one motor controller drives and controls a plurality of motors, there is a problem of an increased number of necessary machine kinds (current detection means differing in conversion ratio).

SUMMARY OF THE INVENTION

The object of the invention is to alleviate restriction in combination of a motor controller and a motor which will be caused by a conversion ratio with which a current detected by a motor current detector is converted into a unit (such as voltage) easily usable in motor current control.

The present invention relates to a motor controller which comprises switching elements for controlling currents flowing through windings of a motor, current detection means for detecting current flowing through the windings of the motor, and current control means for generating a control signal of the switching elements on the basis of a current command and an output of the current detection means. And in the present invention, there is newly provided conversion ratio alteration means capable of selecting and altering a conversion ratio with which a detection signal detected by the current detection means is converted to an input signal of the current control means. As a result, restrictions imposed on the combination of the motor and the controller are lightened. Furthermore, there is provided means which compares an output of the current detection means with a predetermined value, and when a current value of at least one phase has exceeded the predetermined value, the means turns off the switching elements. The motor and the controller are thus protected.

The conversion ratio which the conversion ratio alteration means output may be automatically altered on the basis of information supplied from the motor, automatically altered on the basis of a command given by a host controller, or altered on the basis of a preset switch.

Furthermore, conversion means for converting a detection signal detected by the current detection means into a signal to be inputted to the current control means may be mounted between the current detection means and the current control means so as to be freely exchangeable and so as to conform to the motor.

The current detection means may output a detected current value as an analog voltage, a digital value, or a pulse train. The conversion ratio alteration means converts the output signal to an input signal of the current control means with the selected conversion ratio.

In the present invention, the conversion ratio to be used when converting the current value detected by the current detection means to an easy usable unit can be selected and altered. Accordingly, motors of different kinds can be driven and controlled by one controller. Therefore, restrictions imposed on the combination of the motor and the controller are reduced. Furthermore, since one motor controller suffices, handling and management become easy in manufacturing, distribution, and maintenance. There are brought about merits in various aspects.

BRIEF DESCRIPTION OF THE DRAWINGS

The foregoing and other objects and features of the invention will become apparent from the following description of preferred embodiments of the invention with reference to the accompanying drawings, in which.

DESCRIPTION OF THE PREFERRED EMBODIMENTS

Figure 1:
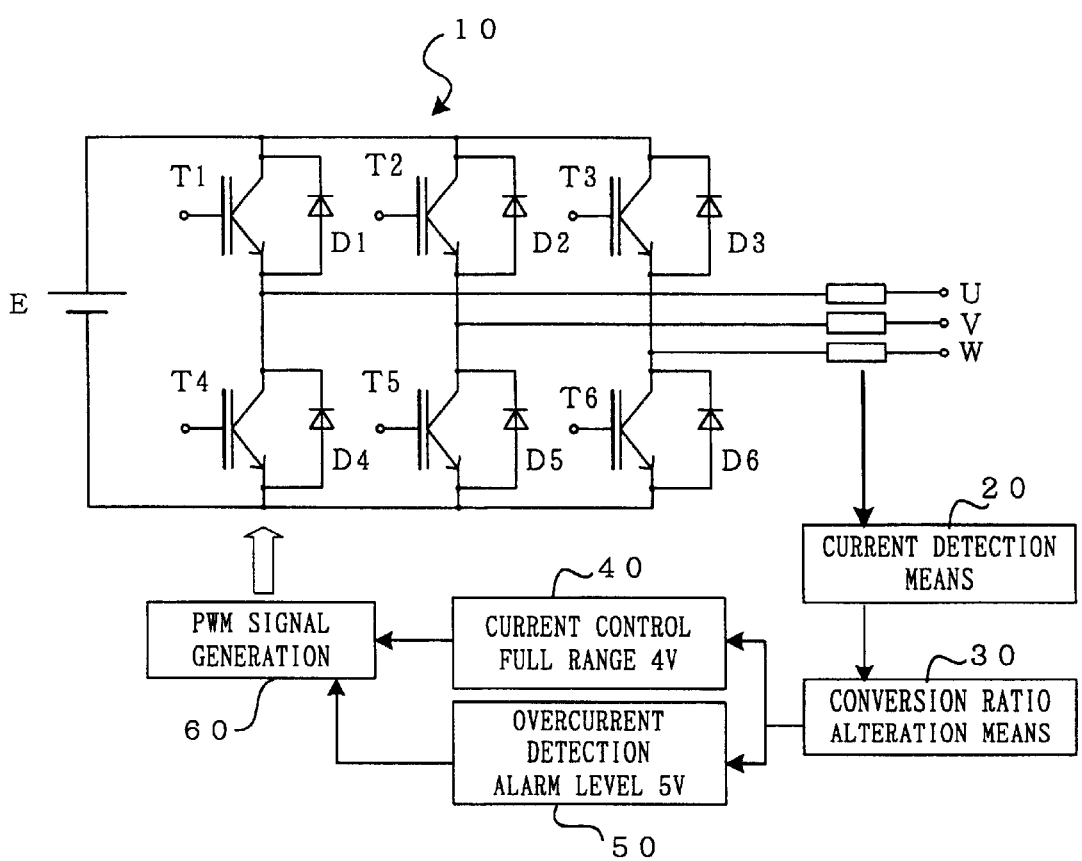
FIG. 1 is a block diagram showing a principal part of a motor controller in an embodiment of the present invention.
Figure 2:
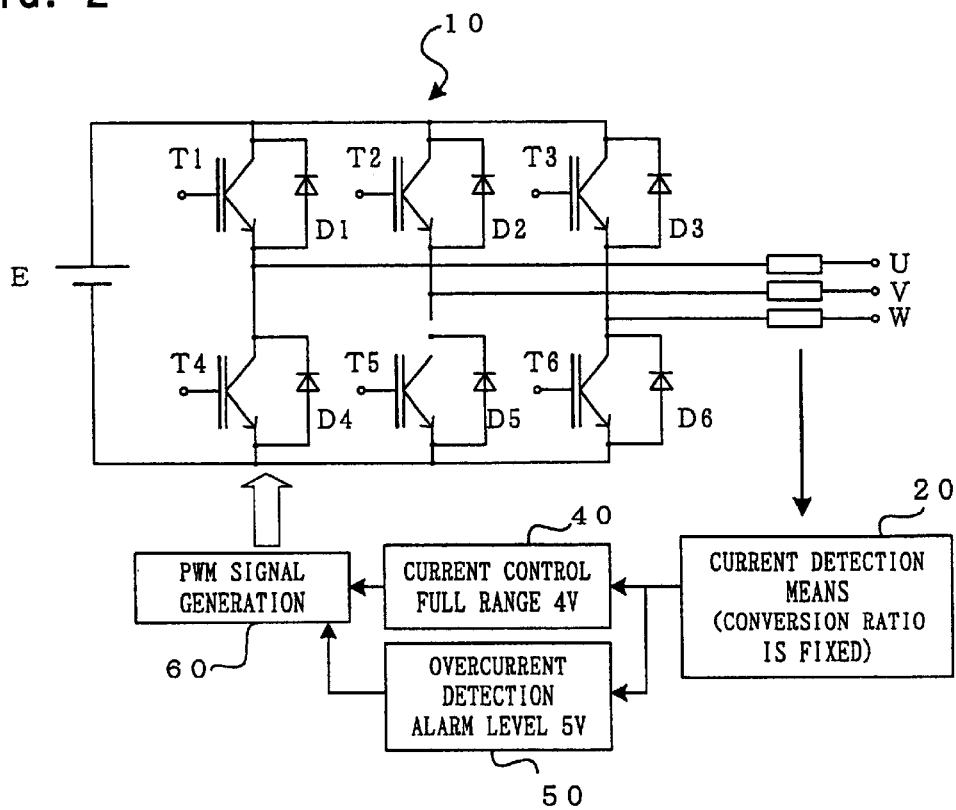
FIG. 2 is a block diagram of a principal part of a motor controller of prior art.

FIG. 1 is a block diagram showing a principal part of an embodiment of a motor controller according to the present invention. The same elements as those shown in FIG. 2 are denoted by like characters. The motor controller shown in FIG. 1 differs from that shown in FIG. 2 in that conversion ratio alteration means 30 is provided in the former.

A current value detected by the current detection means 20 is converted into an easily usable unit such as voltage with a conversion ratio altered and preset by the conversion ratio alteration means 30, as shown in FIG. 1. A result of the conversion is output to the current control means 40 and the overcurrent detection means 50. Other elements are the same as those of the prior art example shown in FIG. 2, and consequently description thereof will be omitted.

By referring to the example described earlier, the present embodiment will now be described. Assuming that the full range of current control is 4 V and the overcurrent protection voltage is 5 V, the conversion ratio is set to 1/10 in the case of a motor which is at least 50 A in demagnetization limit current and 40 A in commanded maximum current, that is:

40×(1/10)=4;

50×(1/10)=5.

In the case of a motor which is at least 100 A in demagnetization limit current and 80 A in commanded maximum current, the conversion ratio is set to 1/20, that is:

80×(1/20)=4;

100×(1/20)=5.

As described above, by making it possible to alter and preset the conversion ratio to be used when converting a detected current value into a voltage easy to use for control in the conversion ratio alteration means 30, the number of motor kinds which can be controlled by one motor controller increases, and the restrictions imposed on the combination of the motor controller and the motor decreases. Especially in the case of a multi-shaft controller in which a plurality of motors are controlled by one controller, reduction in kinds of controllers becomes more effective. For example, a three-shaft controller corresponding to three kinds of motor respectively having maximum currents of 20 A, 40 A and 80 A will now be considered. In the prior art controller, the conversion ratio is fixed. Therefore, ten kinds of controller are needed as listed below so as to associate combinations of three-shaft motors respectively with all combinations of 20 A, 40 A and 80 A.

|  | Shaft | | |
|---|---|---|---|
|  | First Shaft | Second Shaft | Third Shaft |
| Current | 20 A | 20 A | 20 A |
|  | 20 A | 20 A | 40 A |
|  | 20 A | 20 A | 80 A |
|  | 20 A | 40 A | 40 A |
|  | 20 A | 40 A | 80 A |
|  | 20 A | 80 A | 80 A |
|  | 40 A | 40 A | 40 A |
|  | 40 A | 40 A | 80 A |
|  | 40 A | 80 A | 80 A |
|  | 80 A | 80 A | 80 A |

On the other hand, in the controller according to the present invention, if the conversion ratios with which the maximum currents 20 A, 40 A and 80 A can be converted into a full range, for example, 4 V, can be altered to 1/5, 1/10 and 1/20, respectively, by the conversion ratio alteration means 30, one controller suffices.

Figure 3:
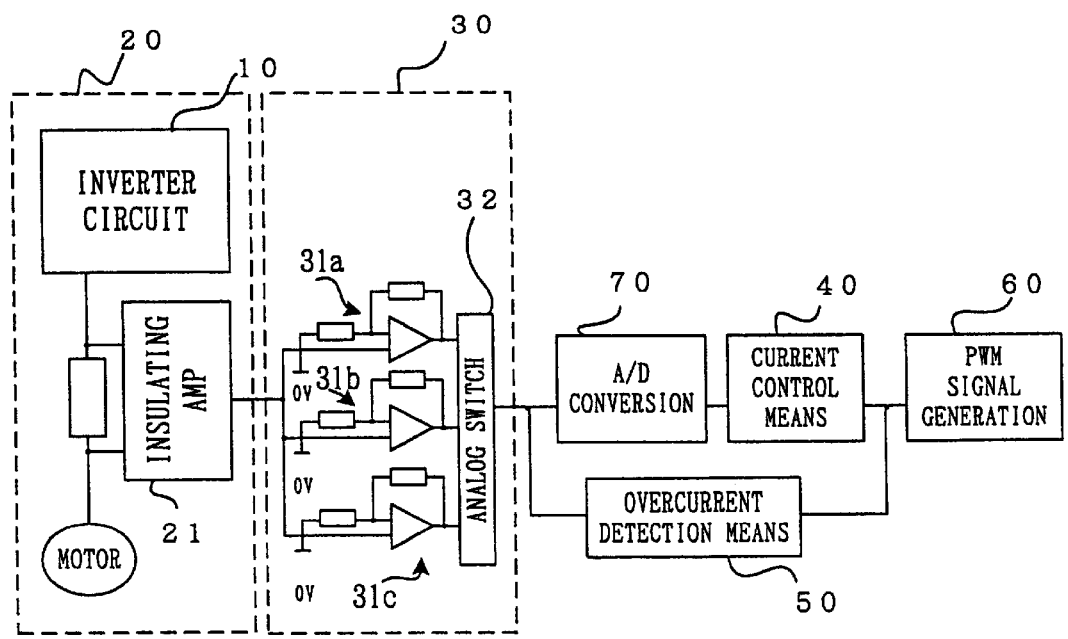
FIG. 3 is a block diagram showing the configuration of conversion ratio alteration means adapted to current detection means of analog voltage output type in an embodiment of the present invention.
Figure 4:
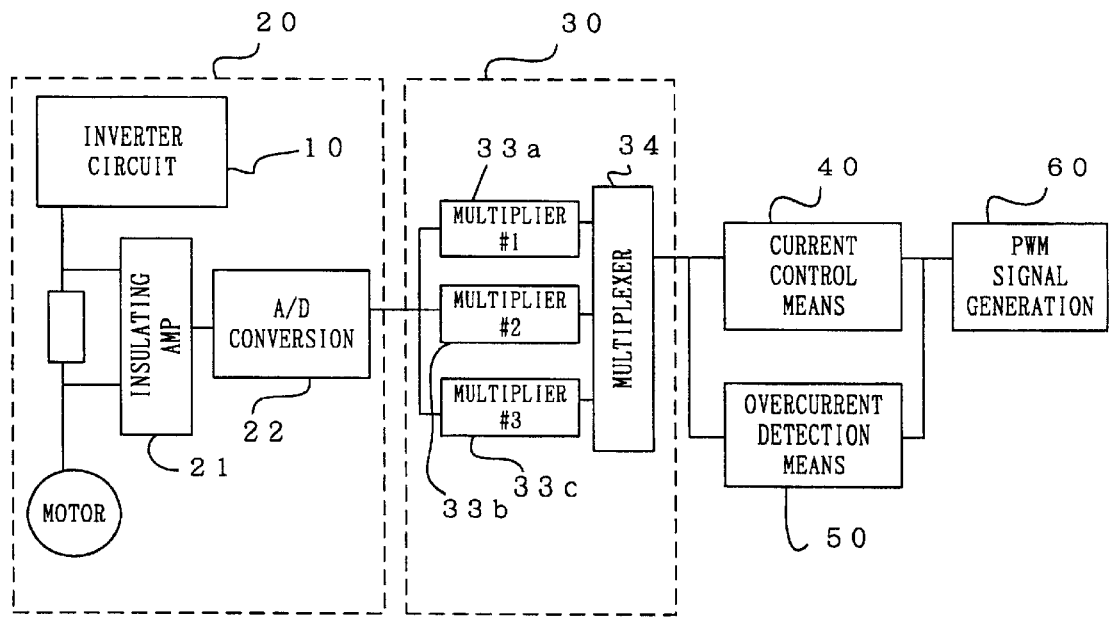
FIG. 4 is a block diagram showing the configuration of conversion ratio alteration means adapted to current detection means of digital signal output type in an embodiment of the present invention.
Figure 5:
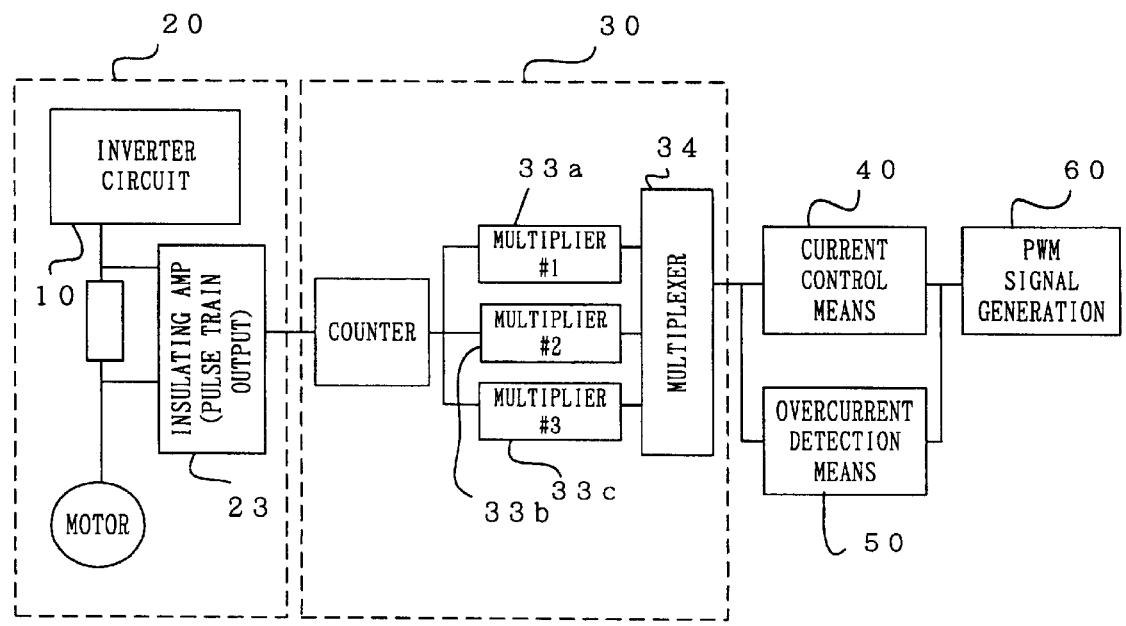
FIG. 5 is a block diagram showing the configuration of conversion ratio alteration means adapted to current detection means of pulse train output type in an embodiment of the present invention.

FIGS. 3 to 5 are block diagrams showing the configuration of the conversion ratio alteration means 30 adapted to the kind of the current detection means 20. In each of FIGS. 3 to 5, the current detection means 20 corresponding to one phase is shown.

FIG. 3 shows an example of current detection means 20 which detects a motor drive current (corresponding to one phase) by using an insulating amplifier 21 and outputs an analog voltage. The conversion ratio alteration means 30 includes three amplifiers 31a to 31c, and an analog switch 32. The analog voltage output from the current detection means 20 is inputted to the three operational amplifiers 31a, 31b and 31c having different gains. Outputs of these operational amplifiers 31a, 31b and 31c are outputted via the analog switch 32.

In the case where the maximum currents 20 A, 40 A and 80 A are converted into a full range, for example, 4 V in the above described example, the gains of the amplifiers 31a, 31b and 31c are set to 1/5, 1/10 and 1/20, respectively. One of the outputs of the amplifiers is selected by the analog switch 32 and outputted. An analog voltage signal outputted from the conversion ratio alteration means 30 is converted into a digital signal by an A/D converter 70 and inputted to current control means 40, where current feedback control is effected by taking a current command as a target value, in the same way as the prior art, and a signal for generating a PWM signal is outputted to PWM signal generation means 60.

Furthermore, the analog voltage signal outputted from the conversion ratio alteration means 30 is inputted to overcurrent detection means 50, and compared with preset voltage (5 V in the example described above). If the analog voltage signal exceeds the preset voltage, the overcurrent detection means 50 inhibits output of a PWM signal from the PWM signal generation means, and turns off switching elements T1 to T6 of an inverter circuit 10 to protect the motor and the device.

FIG. 4 shows a type of the current detection means 20 which outputs a detected current value in the form of a digital signal. A current value detected by an insulating amplifier 21 is converted into a digital signal by an A/D converter 22. In this case, the conversion ratio alteration means 30 includes three multipliers 33a, 33b and 33c, and a multiplexer 34. The digital signal output of the A/D converter 22 is inputted to the three multipliers 33a, 33b and 33c, multiplied by respective preset constants, and output. In the above described example, the constants in the multipliers 33a, 33b and 33c by which the output of the A/D converter 22 is multiplied are 1/5, 1/10 and 1/20.

The multiplexer 34 selects the output of one of the preset multipliers and outputs it. The output is input to the current control means 40 and the overcurrent detection means 50. In this case, as conversion into a digital signal has already been conducted for the output, an A/D converter is not necessary, unlike the example shown in FIG. 3. The overcurrent detection means 50 is formed of a digital comparator. Ensuing operation is the same as the example described with reference to FIG. 3.

FIG. 5 shows an example using current detection means 20 which outputs a detected current value in the form of a pulse train. The current value detected by an insulating amplifier 23 is outputted in the form of a pulse train. Conversion ratio alteration means 30 includes a counter 35, three multipliers 33a, 33b and 33c, and a multiplexer 34. The pulse train outputted from the insulating amplifier 23 is inputted to the counter 35, and counted every predetermined period. The count value is inputted to three multipliers 33a, 33b and 33c, and multiplied by preset constants (1/4, 1/10 and 1/20 in the above described example), respectively. An output of a multiplier preset and selected by the multiplexer 34 is output as an output of the conversion ratio alteration means 30. Ensuing operation is the same as that shown in FIG. 4.

As for the selection of a conversion ratio conducted by the conversion ratio alteration means 30, the conversion ratio may be manually preset according to the kind of a motor to be used (magnitude of the maximum current value). Or the conversion ratio may be automatically preset by reading the motor kind.

Figure 6:
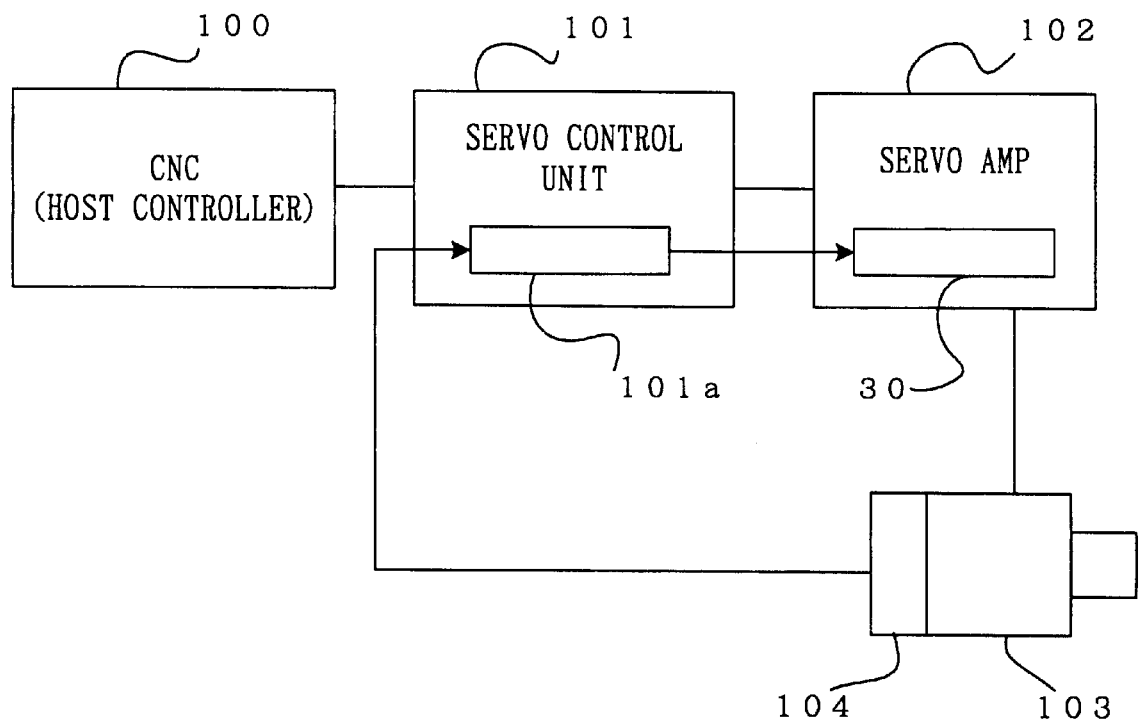
FIG. 6 is a block diagram showing an example of application of a motor controller in which a conversion ratio is automatically altered and preset, to a numerical control device (CNC).

FIG. 6 is a block diagram of an example in which automatic alteration of the conversion ratio has been applied to a numerical control device (CNC).

A main processor of a numerical control device (CNC) 100 serving as a host controller issues a movement command or the like to a servo control unit 101. A processor of the servo control unit 101 effects position and speed loop control on the basis of a commanded movement and a position and speed feedback signal supplied from the encoder 104 attached to a servo motor 103 to detect a rotational position and a speed of the servo motor 103. In addition, the processor of the servo control unit 101 effects the above described current feedback control, and drives and controls the servo motor 103 via a servo amplifier 102. The control heretofore described is the same as the control of a servo motor conducted by a conventional numerical control device.

Especially, in connection with the present invention, ID information indicating the kind, characteristics, and so on is written in a ROM in the encoder 104 for detecting the rotation position and the speed of the servo motor 103, at the time of motor manufacture. As one of the ID information, information of the maximum current value of the motor is also written. Furthermore, in a memory of the servo control unit 101, a table 101a storing information corresponding to the conversion ratio in association with the ID information is provided.

When power is turned on for the controller, the processor of the servo control unit 101 reads ID information from the ROM of the encoder 104, reads the information of the conversion ratio stored in the table, and outputs an alteration instruction to conversion ratio alteration means 30 of the servo amplifier 102. In the case where the conversion ratio alteration means 30 includes the amplifiers 31a to 31c and the analog switch 32 as shown in FIG. 3, the alteration instruction becomes a signal for selection of the amplifiers 31a to 31c conducted by the analog switch 32. One of the amplifiers 31a to 31c corresponding to the ID information of the motor is thus selected by the analog switch 32.

In the case of the conversion ratio alteration means 30 shown in FIGS. 4 and 5, one of the multipliers 33a to 33c for multiplying the input signal by a conversion ratio constant corresponding to the ID information of the motor is selected by the multiplexer 34.

In the above described embodiment, the processor of the servo control unit 101 reads the ID information stored in the ROM of the encoder when power is turned on. Alternatively, the main processor of the numerical control device 100 may read out the ID information stored in the ROM, output a selection signal for selecting a conversion ratio corresponding to the ID information thus read out to the conversion ratio alteration means 30 of the servo amplifier 102 via the servo control unit 101, and select and preset a conversion ratio which conforms to the servo motor to be used.

In the case where the encoder is not equipped with the ROM for storing the ID information, data for selecting a conversion ratio is inputted from MDI (manual data input means) of the numerical control device 100. The main processor of the numerical control device 100 selects one of the amplifiers 31a to 31c or the multipliers 33a, to 33c providing a target conversion ratio, by using the analog switch 32 or the multiplexer 34 of the conversion ratio alteration means 30 of the servo amplifier via the servo controller unit 101.

Alternatively, a preset switch for selecting and presetting the conversion ratio of the conversion ratio alteration means 30 may be provided in the servo amplifier unit 102. By using this switch, the analog switch 32 or the multiplexer 34 is preset so as to select desired one of the amplifiers 31a to 31c or the multipliers 33a, to 33c.

Alternatively, a motor controller may be designed such that any one of the amplifiers or multipliers, selected from among those prepared in advance, can be detachably mounted on the motor controller. And a type of amplifier or multiplier which will give a conversion ratio adapted to the motor to be used is selected and mounted to the motor controller.

For example, the motor controller shown in FIG. 3 may be designed such that any amplifier serving as a conversion ratio alteration means 30 can be detachably mounted using connectors between the insulating amplifier 21 and the A/D converter 70 or the overcurrent detection means 50. And an amplifier which will give a conversion ratio adapted to the motor to be used is selected and mounted there.

Further, the motor controller shown in FIG. 4 may be designed such that any multiplier can be detachably mounted, in place of the three multipliers and the multiplexers. And a multiplier which will give a conversion ratio adapted to the motor to be used is selected and mounted there.

Then, the output of the A/D converter is multiplied in this multiplier by a constant corresponding to a preset conversion ratio. A resultant product output is supplied to the current control means 40 and the overcurrent detection means 50.

Further, the motor controller shown in FIG. 5 may be designed such that any multiplier can be detachably mounted, in place of the three multiplier and the multiplexer. And a multiplier which will give a conversion ratio adapted to the motor to be used is selected and mounted there. Then the output of the counter 35 is multiplied in this multiplier by a constant corresponding to a preset conversion ratio. A resultant product output is supplied to the current control means 40 and the overcurrent detection means 50.

What is claimed is:

1. A motor controller, comprising:

switching elements for controlling currents flowing through windings of a motor;

current detection means for detecting a current flowing through each of said windings of said motor and converting the detected current into a physical quantity to be used for current control using a conversion ratio for conversion of detected current into physical quantity to be used for current control;

conversion ratio alteration means for changing said conversion ratio in the current detection means; and current control means for generating a control signal for each of said switching elements based on a current command and an output of said current detection means which has been converted with the conversion ratio set in said conversion ratio alteration means.

2. A motor controller according to claim 1, further comprising protection means which compares an output of said current detection means with a predetermined value, wherein, when a current value of at least one phase has exceeded said predetermined value, said protection means turns off said switching elements.

3. A motor controller according to claim 1, wherein said conversion ratio is automatically altered on the basis of information supplied from the motor.

4. A motor controller according to claim 1, wherein said conversion ratio is automatically altered on the basis of command given by a host controller.

5. A motor controller according to claim 1, wherein said conversion ratio is altered on the basis of a preset switch.

6. A motor controller according to claim 1, wherein said current detection means outputs a detected current value in the form of an analog voltage, a digital value, or a pulse train, and said conversion ratio alteration means converts said output signal into an input signal to said current control means with the selected conversion ratio.

7. A motor controller, comprising:

an inverter circuit including a plurality of switching elements connected to the windings of a motor;

current detector detecting a current flowing through the windings of each phase of the motor and outputting a signal corresponding to the detected current;

conversion ratio alteration means including a plurality of amplifiers different in gain and a switch for selecting any one from among these amplifiers;

current control means for receiving current command and the output of said conversion ratio alteration means and conducting current feed back control based on these received data;

PWM (pulse width modulation) signal generation means for receiving the output of said current control means and generating a PWM signal and outputting it; wherein an ID information is incorporated into a part of the motor, and said switch is turned on so as to select an amplifier corresponding to the ID information.

8. A motor controller according to claim 7, wherein overcurrent detection means is mounted between said conversion ratio alteration means and said PWM signal generation means, and the overcurrent detection means compares the voltage outputted from said conversion ratio alteration means with a predetermined voltage, and then inhibits said PWM signal generation means from generating a PWM signal in case where the voltage outputted from the conversion ratio alteration means exceeds said predetermined voltage.

* * * * *